United States Patent
Sato et al.

(10) Patent No.: US 6,611,592 B1
(45) Date of Patent: Aug. 26, 2003

(54) INCOMING-CALL TONE GENERATION DEVICE

(75) Inventors: Hiroki Sato, Kanagawa (JP); Koichiro Togao, Kanagawa (JP); Nobuhiro Shimizu, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/479,299

(22) Filed: Jan. 6, 2000

(30) Foreign Application Priority Data

Jan. 8, 1999 (JP) ............................................ 11-003286

(51) Int. Cl.7 ............................................... H04M 1/00
(52) U.S. Cl. ............................ 379/374.01; 379/374.02; 379/373.01; 379/373.02; 379/373.03; 379/374.04; 381/61; 381/62; 84/626; 84/630; 84/615; 84/622; 84/627; 84/618
(58) Field of Search ......................... 379/374, 372–376, 379/179, 180, 418, 908, 374.01, 374.02; 455/412–422; 381/61, 62; 84/626, 630, 615, 622, 627, 618

(56) References Cited

U.S. PATENT DOCUMENTS

| | | | |
|---|---|---|---|
| 4,523,058 A | * | 6/1985 | Stevens et al. |
| 4,966,051 A | * | 10/1990 | Tajima .......................... 84/663 |
| 4,998,281 A | * | 3/1991 | Sakata |
| 5,514,831 A | * | 5/1996 | Imamura |
| 5,699,420 A | * | 12/1997 | Michel |
| 5,753,845 A | * | 5/1998 | Nagata et al. ................. 84/626 |
| 5,763,807 A | * | 6/1998 | Clynes ......................... 84/705 |
| 5,841,875 A | * | 11/1998 | Kuroki et al. ................. 381/61 |
| 5,895,879 A | * | 4/1999 | Kamiya et al. |
| 5,956,680 A | * | 9/1999 | Behnke et al. |

FOREIGN PATENT DOCUMENTS

DE    19620624 A1 * 11/1997 ............ H04M/1/00

* cited by examiner

*Primary Examiner*—Forester W. Isen
*Assistant Examiner*—Ramnandan Singh
(74) *Attorney, Agent, or Firm*—Pearne & Gordon LLP

(57) ABSTRACT

A incoming-call tone generation device comprises: a first storage unit 1, for storing an effect calculation formula for incoming-call tone data; a second storage unit, for storing incoming-call tone data that consist of data for original sounds; a controller, for reading incoming-call tone data from the second storage unit and transmitting the data to a digital signal processor 4, and for controlling a D/A converter 5; the digital signal processor 4, for calculating an effect pattern and a sine wave using the calculation formula read from the first storage unit, and for performing an envelope process for the incoming-call tone data; the D/A converter 5, for converting, into analog data, digital incoming-call tone data obtained during the envelope process, and for outputting an analog incoming-call tone; and a loudspeaker 6 through which an analog incoming-call tone is released.

6 Claims, 3 Drawing Sheets

① ENVELOPE

② ECHO

③ TREMOLO

INCOMING-CALL TONE GENERATION DEVICE

BACKGROUND OF THE INVENTION

The present invention relates to a incoming-call tone generation device, and in particular to a device for generating a incoming-call tone that is not monotonous, like an electronic sound, but that instead resembles a natural tone produced by a musical instrument.

Conventionally, a signal generation circuit, which is provided for a telephone set and which generates a tone signaling the arrival of an incoming call, produces a monotonous, somewhat unpleasant electronic sound. Since there is no variation, no rise and fall in the tone generated by the signal generation circuit, the sound is offensive to the ears of user and nonuser alike.

To resolve this problem, one conventional method provides for the use of a telephone set recording device that, in advance, records desired musical tones, which are then played back to signal the arrival of an incoming call. However, with this method, extra labor is required of a maker or a user.

It is, therefore, one objective of the present invention to provide a incoming-call tone generation device that calculates an effect pattern for incoming-call tone data, and that performs an envelope process for the incoming-call tone data in order to produce a tone that resembles one produced by a musical instrument.

SUMMARY OF THE INVENTION

To achieve the above objective, according to the present invention, a incoming-call tone generation device comprises: a storage unit for storing digital incoming-call tone data; a digital signal processor for calculating an effect pattern for the incoming-call tone data read from the storage unit, and for performing an envelope process for the incoming-call tone data; and a D/A converter for converting the incoming-call tone data obtained by the envelope process, wherein the incoming-call tone data obtained by the envelope process are converted into analog data, with which a incoming-call tone is generated that is similar to a natural tone produced by a musical instrument.

The thus generated incoming-call tone sounds like a natural tone that is pleasing to the ears of a user and of nearby nonusers.

Further, according to the incoming-call tone generation device of the present invention, the digital signal processor reads data from the storage unit, in which is stored an effect calculation formula for the incoming-call tone data, and employs the data to calculate the effect pattern and to perform the envelope process for the incoming-call tone data. Since the effect pattern is calculated and the envelope process is performed for the incoming-call tone data, a incoming-call tone can be generated that is similar to a sound produced by a musical instrument.

Preferably, the volume of a rising or a falling tone may be controlled during the envelope process. Through this process, a tone that is not monotonous can be produced.

Needless to say, the volume for a rising and falling tone may be controlled during the envelope process. Through this process, a tone that is not monotonous can be produced.

More preferably, an echo may be included as the effect pattern. With this effect pattern, a tone that is not monotonous can be produced.

Further, tremolo may be included as the effect pattern. With this effect pattern, a tone that is not monotonous can be produced.

Furthermore, vibrato may be included as the effect pattern. With this effect pattern, a tone that is not monotonous can be produced.

Moreover, harmony may be included as the effect pattern. With this effect pattern, a tone that is not monotonous can be produced.

DETAILED DESCRIPTION OF THE PREFERRED EMBODIMENTS

Figure 1:
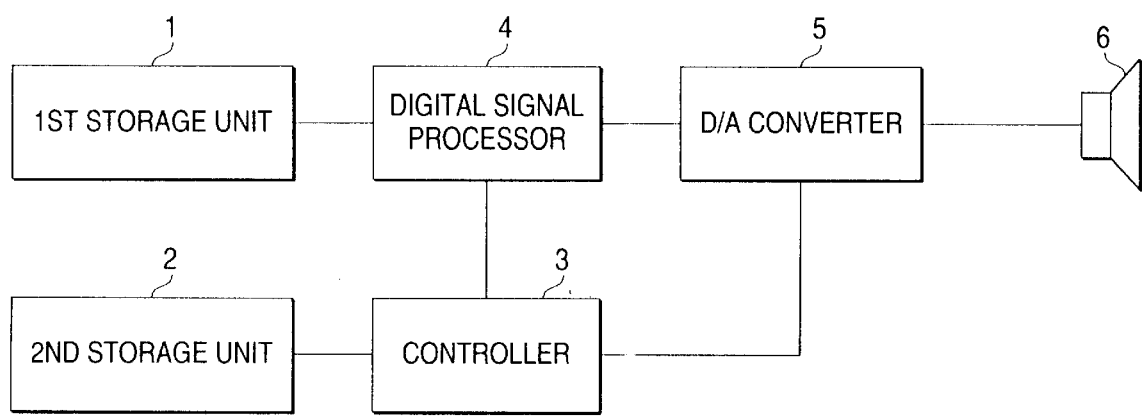
FIG. 1 is a block diagram illustrating the arrangement of a incoming-call tone generation device according to one embodiment of the present invention.

One embodiment of the present invention will now be described while referring to the drawings.

FIG. 1 is a block diagram illustrating the arrangement of a incoming-call tone generation device according to the embodiment of the present invention. In FIG. 1, the incoming-call tone generation device comprises: a first storage unit 1, for storing an effect calculation formula for incoming-call tone data; a second storage unit, for storing incoming-call tone data that consist of data for original sounds; a controller, for reading incoming-call tone data from the second storage unit and transmitting the data to a digital signal processor 4, and for controlling a D/A converter 5; the digital signal processor 4, for calculating an effect pattern and a sine wave using the calculation formula read from the first storage unit, and for performing an envelope process for the incoming-call tone data; the D/A converter 5, for converting, into analog data, digital incoming-call tone data obtained during the envelope process, and for outputting an analog incoming-call tone; and a loudspeaker 6 through which an analog incoming-call tone is released.

An example of the processing performed when an effect pattern is prepared, and of an envelope process will now be described while referring to FIGS. 2 and 3.

First, the envelope process for a incoming-call tone will be explained while referring to (1) in FIG. 2. While a monotonous incoming-call tone is produced when the envelope process is not performed, when the envelope process is performed a tone similar to one produced by a musical instrument can be produced by controlling the volume at the leading edge (attack) and at the trailing edge (release) of a incoming-call tone. Further, a plurality of envelope process patterns can be obtained by changing the volume at the attack and release portions.

An echo, which is one of the effect patterns, will now be explained while referring to (2) in FIG. 2. A delay or attenuation process is performed for a current incoming-call tone to add reverberation. A plurality of incoming-call tone patterns can be obtained by changing a delay time or varying the degree of attenuation.

Tremolo, which is one of the effect patterns, will now be explained while referring to (3) in FIG. 2. Tremolo is an effect that is added by periodically altering the volume. A plurality of incoming-call tone patterns can be obtained by changing the amount of fluctuation and the period of fluctuation for a volume.

Vibrato, which is one of effect patterns, will now be explained. Vibrato is an operation during which frequency is periodically varied. A plurality of incoming-call tone patterns can be obtained by changing the frequency that is fluctuated and the fluctuation period.

Harmony, which is one of the effect patterns, will now be explained. Harmony is a process during which an original tone is synthesized with a tone whose frequency has been shifted so it is a semitone distant from the original. A plurality of incoming-call tone patterns can be obtained by altering the distance of the shift away from the original tone.

The combining of an envelope process with an effect pattern will now be described while referring to FIG. 3.

Figure 2:
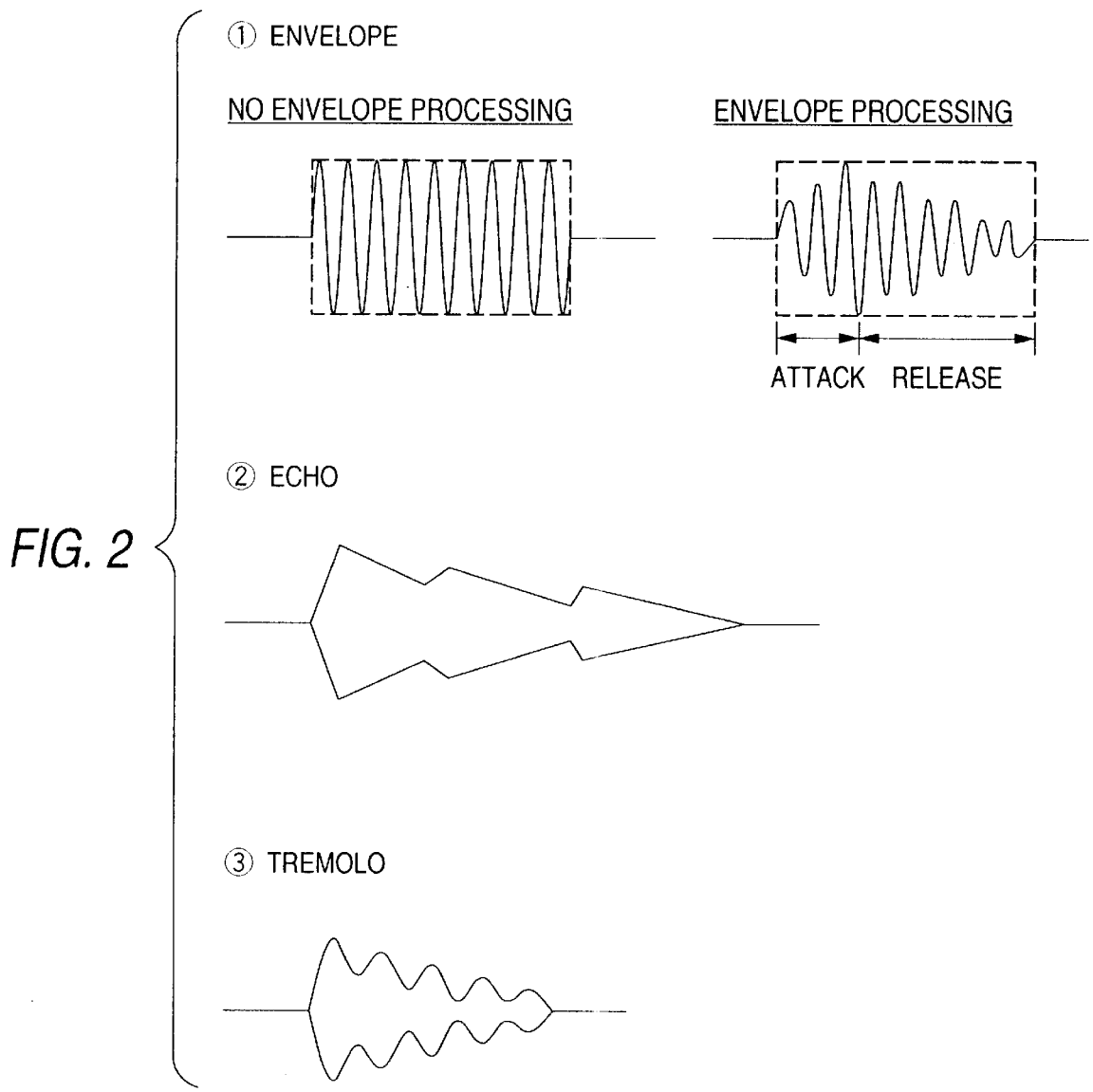
FIG. 2 is a diagram for explaining example effect patterns prepared by, and an envelope process performed by, the incoming-call tone generation device according to the embodiment of the present invention.
Figure 3:
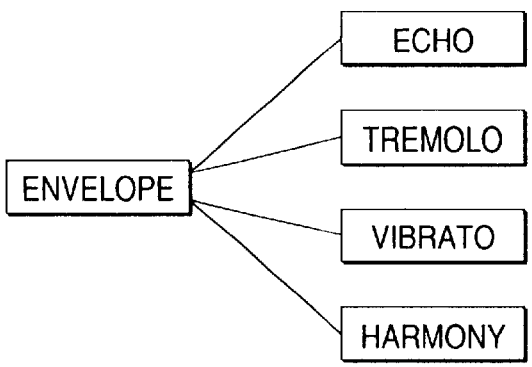
FIG. 3 is a diagram for explaining possible combinations of an envelope process with effect patterns.

More types of incoming-call tone patterns can be obtained by combining envelope processes with the effect patterns in FIG. 2.

Supposing that there are three envelope processes and four effect patterns, the following combinations can be obtained.

(1) No effect pattern (only an envelope process): 3 types (2) Echo as an effect pattern: 12 types (3) Tremolo as an effect pattern: 12 types (4) Vibrato as an effect pattern: 12 types (5) Harmony as an effect pattern: 12 types A total of 51 types of incoming-call tone patterns can be obtained.

Figure 4:
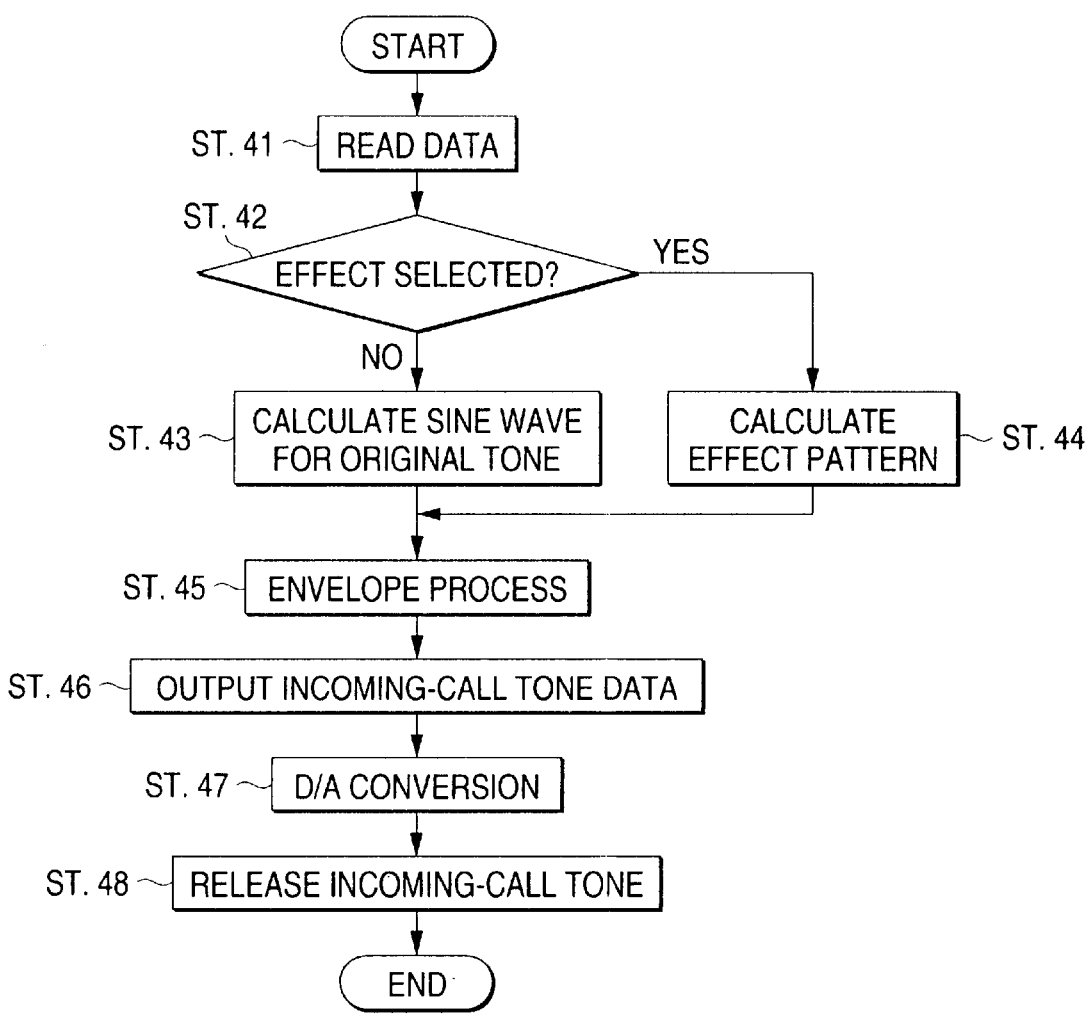
FIG. 4 is a flowchart for explaining the effect of processing performed by the incoming-call tone generation device according to the embodiment of the present invention.

The incoming-call tone effect process will now be described while referring to FIG. 4. When the process is begun, at step S41, effect calculation formula data for the signal arrival data are read from the first storage unit 1. At step S42 a check is performed to determine whether a user has selected an effect process for a incoming-call tone.

If the user has not selected an effect process for the incoming-call tone, program control advances to step S43, whereat the sine wave for the original tone is calculated by the digital signal processor 4 and program control thereafter goes to step S45. If, at step S42, the user has selected an effect process for the incoming-call tone, program control goes to step S44, whereat one of the effect patterns, echo, tremolo, vibrato or harmony is calculated, and program control thereafter advances to step S45.

At step S45, the envelope process as shown in FIG. 2 is performed for the sine wave obtained at step S43, or for the effect pattern obtained at step S44.

At step S46, the digital signal arrival data obtained during the envelope process are output, and at step S47, they are converted into an analog signal. At step S48, the analog incoming-call tone is released through the loudspeaker 6. After the sound has been released, the incoming-call tone effect process is terminated.

As is apparent from the above description, the incoming-call tone generation device of the present invention comprises: a storage unit, for storing digital incoming-call tone data; a digital signal processor, for calculating an effect pattern for the incoming-call tone data read from the storage unit, and for performing an envelope process for the subject incoming-call tone data; and a D/A converter, for converting the incoming-call tone data provided by the envelope process, wherein the incoming-call tone data obtained by the envelope process are converted into analog data, which is used for the release of a incoming-call tone that is similar to a tone produced by a musical instrument.

The thus generated incoming-call tone sounds like a natural tone, and is pleasing to the ears both of a user and of nearby nonusers.

What is claimed is:

1. An incoming-call tone generation unit for a personal communication device comprising:

a first storage unit for storing an effect calculation formula;

a second storage unit for storing digital incoming-call tone data;

a D/A converter;

a controller for reading said incoming-call tone data from said second storage unit and for controlling said D/A converter;

a digital signal processor for receiving said incoming-call tone data from said controller, wherein said digital signal processor performs an envelope process on said digital incoming-call tone data using said effect calculation formula to produce a transformed digital call tone with an effect pattern; and a transducer;

wherein said D/A converter converts said transformed digital call tone into an analog incoming-call tone signal, and wherein said a transducer produces an audible tone from said analog incoming-call tone signal received from said D/A converter to notify a user that a call has arrived, wherein said audible tone resembles a natural tone produced by a musical instrument; and further wherein, when a call arrives to the personal communication device, said controller starts to read said incoming-call tone data.

2. An incoming-call tone generation unit for a communication device according to claim 1, wherein said effect calculation formula modifies the volume of a rising or a falling tone.

3. The incoming-call tone generation unit for a communication device according to claim 1, wherein said effect calculation formula provides an echo effect.

4. The incoming-call tone generation unit for a communication device according to claim 1, wherein said effect calculation formula provides a tremolo effect.

5. The incoming-call tone generation unit for a communication device according to claim 1, wherein said effect calculation formula provides a vibrato effect.

6. The incoming-call tone generation unit for a communication device according to claim 1, wherein said effect calculation formula provides a harmony effect.

* * * * *